United States Patent
Matsumoto et al.

(10) Patent No.: US 9,253,365 B2
(45) Date of Patent: Feb. 2, 2016

(54) IMAGE PROCESSING DEVICE FOR GENERATING COMPOSITE IMAGE HAVING PREDETERMINED ASPECT RATIO

(75) Inventors: Kosuke Matsumoto, Akishima (JP); Naotomo Miyamoto, Tokyo (JP); Masaru Onozawa, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 358 days.

(21) Appl. No.: 13/440,887

(22) Filed: Apr. 5, 2012

(65) Prior Publication Data

US 2012/0257085 A1 Oct. 11, 2012

(30) Foreign Application Priority Data

Apr. 7, 2011 (JP) .................................. 2011-085248

(51) Int. Cl.
- *H04N 1/387* (2006.01)
- *H04N 5/232* (2006.01)
- *H04N 1/00* (2006.01)
- *H04N 101/00* (2006.01)

(52) U.S. Cl.
CPC ........... *H04N 1/3876* (2013.01); *H04N 1/3873* (2013.01); *H04N 5/23238* (2013.01); *H04N 5/23293* (2013.01); *H04N 2101/00* (2013.01)

(58) Field of Classification Search
CPC ...................... H04N 5/23238; H04N 5/23232
USPC .................................. 348/218.1, 36–39, 239
See application file for complete search history.

(56) References Cited

U.S. PATENT DOCUMENTS

| | | | |
|---|---|---|---|
| 5,646,679 A | 7/1997 | Yano et al. | |
| 6,867,801 B1 | 3/2005 | Akasawa et al. | |
| 8,068,694 B2 * | 11/2011 | Zhang ................ | H04N 5/23232 382/284 |
| 8,294,805 B2 | 10/2012 | Kita | |
| 8,446,479 B2 * | 5/2013 | Uemura et al. .... | G06K 9/00228 348/220.1 |
| 8,542,946 B2 | 9/2013 | Zhang et al. | |
| 2004/0189849 A1 | 9/2004 | Hofer | |
| 2005/0179817 A1 | 8/2005 | Kida | |
| 2008/0253687 A1 * | 10/2008 | Zhang et al. ................... 382/284 | |
| 2010/0265313 A1 * | 10/2010 | Liu et al. ................ | G06T 3/4038 348/36 |

FOREIGN PATENT DOCUMENTS

| | | |
|---|---|---|
| CN | 1642226 A | 7/2005 |
| JP | 08-018857 A | 1/1996 |
| JP | 11-177802 A | 7/1999 |
| JP | 11-196311 A | 7/1999 |

(Continued)

OTHER PUBLICATIONS

Korean Office Action dated May 13, 2013 (and English translation thereof) in counterpart Korean Application No. 10-2012-0035344.

(Continued)

*Primary Examiner* — Ahmed A Berhan
(74) *Attorney, Agent, or Firm* — Holtz, Holtz & Volek PC

(57) ABSTRACT

A digital camera according to the present invention includes a CCD, a CPU and an image processing section. The CPU sets an arbitrary aspect ratio, and acquires a composite image having a predetermined aspect ratio which has been generated by a plurality of images consecutively captured by the CCD being combined. The image processing section trims the composite image acquired by the CPU to be an image having the set arbitrary aspect ratio.

14 Claims, 10 Drawing Sheets

(56) References Cited

FOREIGN PATENT DOCUMENTS

| | | | |
|---|---|---|---|
| JP | 11-282100 | A | 10/1999 |
| JP | 2000-152042 | A | 5/2000 |
| JP | 2002-330332 | A | 11/2002 |
| JP | 2003-333425 | A | 11/2003 |
| JP | 2008-263538 | A | 10/2008 |
| JP | 2009-284309 | A | 12/2009 |
| JP | 2010-199971 | A | 9/2010 |
| JP | 2010-204773 | A | 9/2010 |
| JP | 2010-246068 | A | 10/2010 |
| TW | 412907 | B | 11/2000 |

OTHER PUBLICATIONS

Korean Office Action dated Dec. 16, 2013 (and English translation thereof) in counterpart Korean Application No. 10-2012-0035344.
Korean Office Action dated Dec. 16, 2013 (and English translation thereof) in counterpart Korean Application No. 10-2013-0142705.
Japanese Office Action dated Mar. 10, 2014 (and English translation thereof) in counterpart Japanese Application No. 2011-085248.
Taiwanese Office Action dated Jan. 17, 2014 (and English translation thereof) in counterpart Taiwanese Application No. 101112143.
Chinese Office Action dated May 20, 2014 in counterpart Chinese Application No. 201210100187.3.

* cited by examiner

FIG. 2
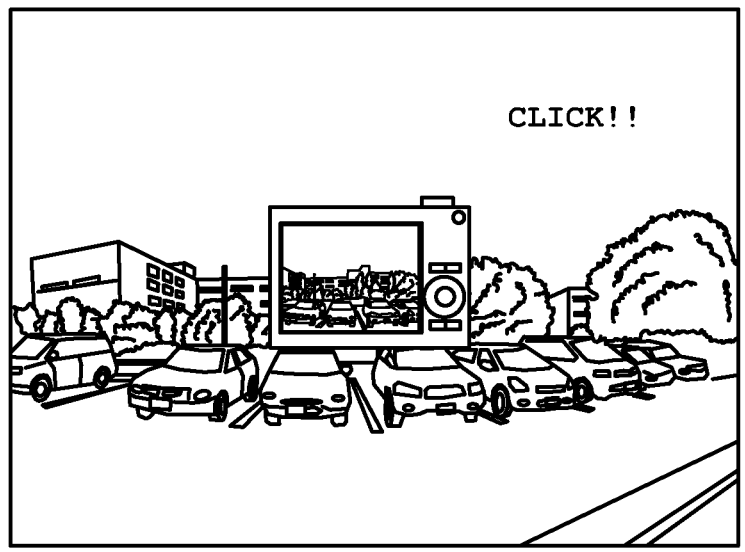
NORMAL IMAGING MODE
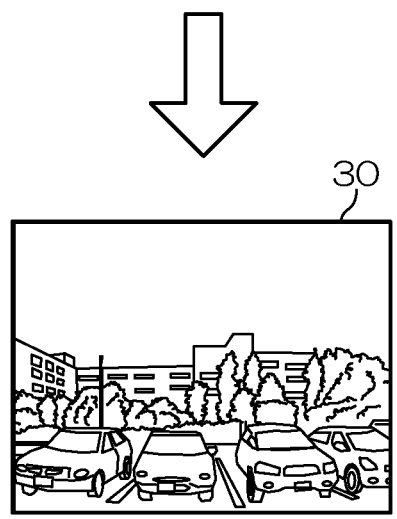
CAPTURED IMAGE

FIG. 3
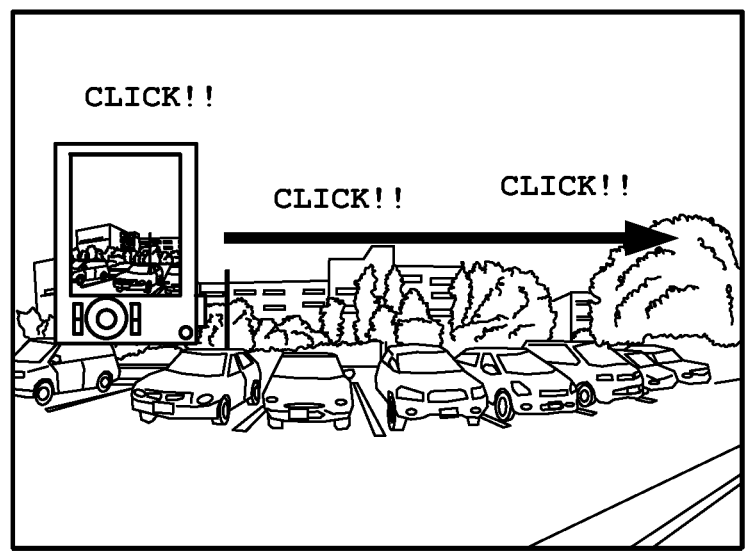
PANORAMIC IMAGING MODE
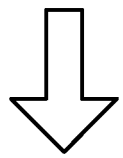
CAPTURED IMAGE
HAVING ASPECT RATIO
OF 4:3
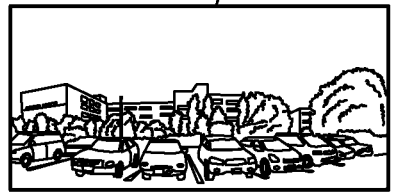
CAPTURED IMAGE
HAVING ASPECT RATIO
OF 16:9

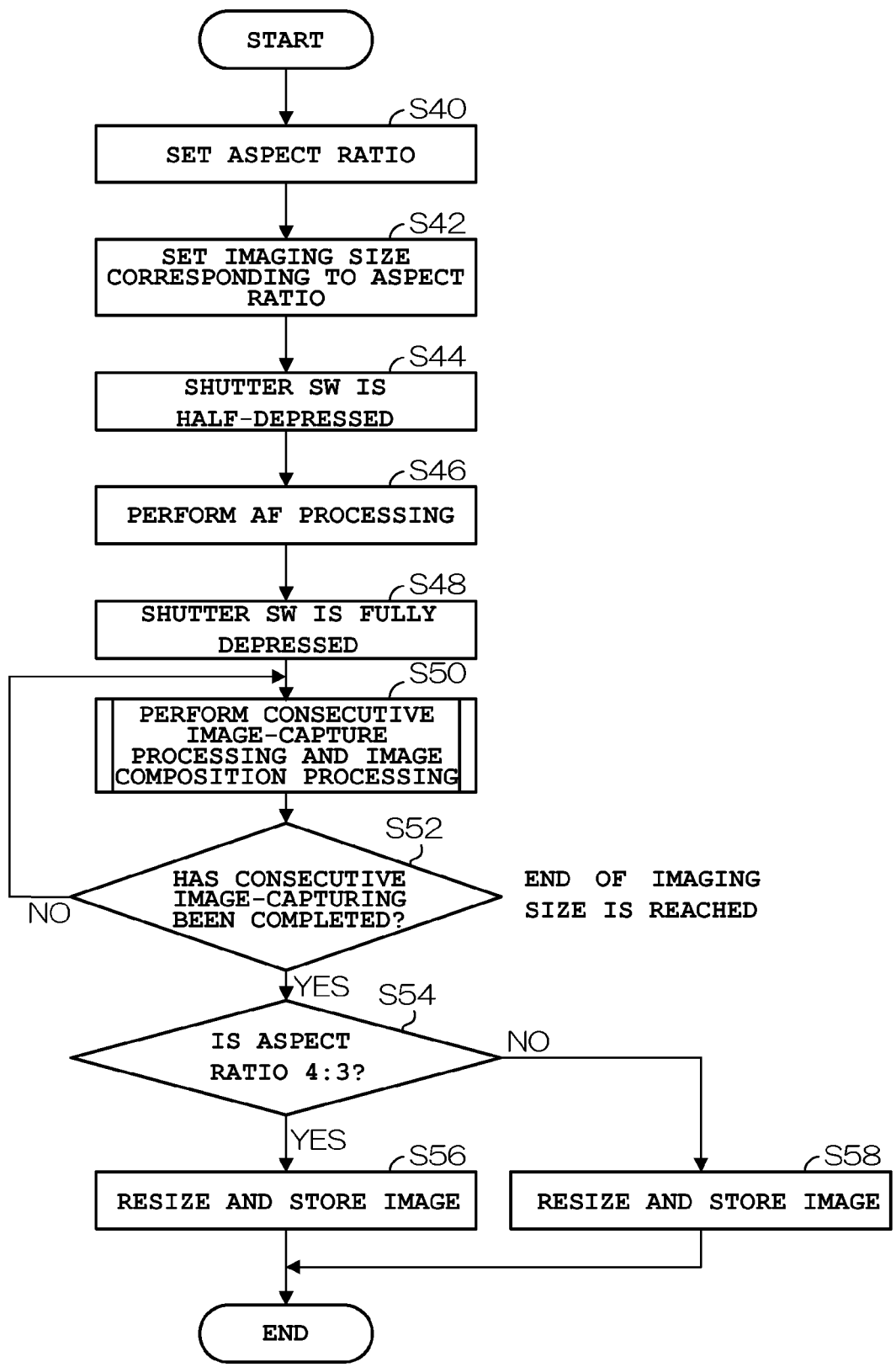

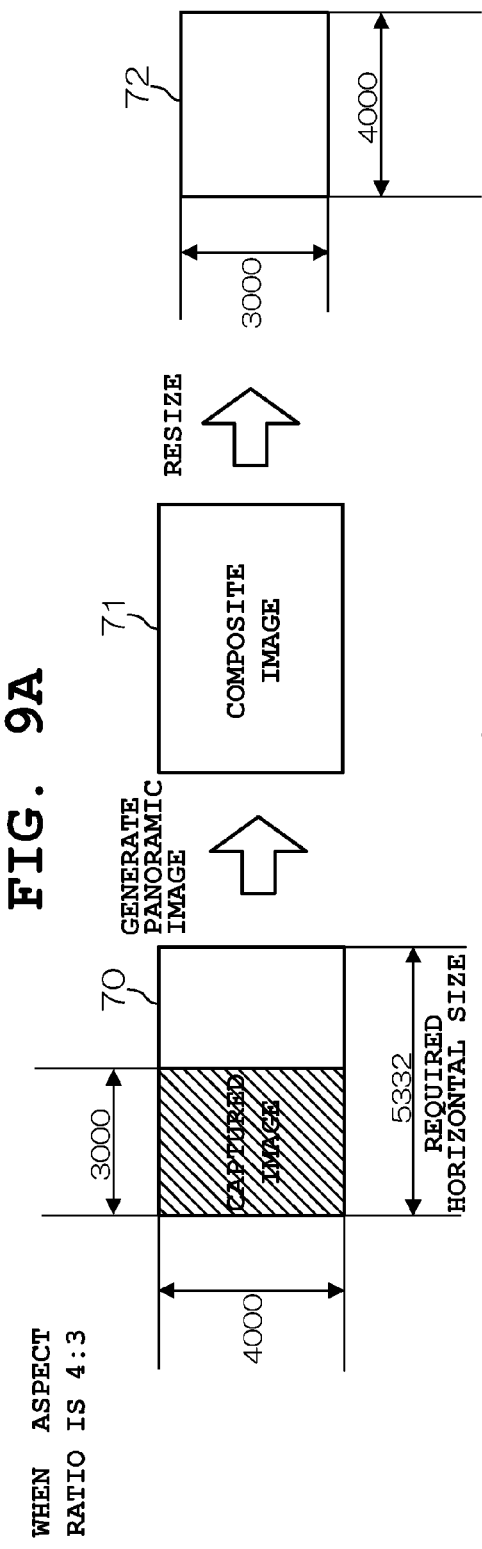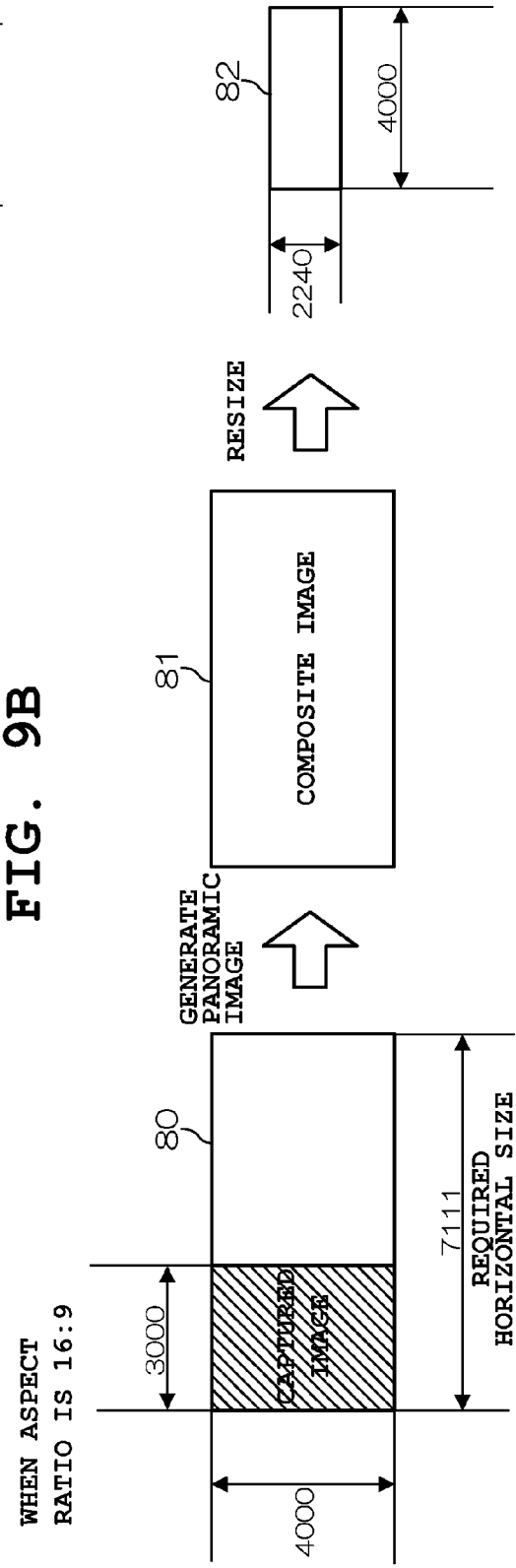

WHEN ASPECT RATIO IS 4:3

WHEN ASPECT RATIO IS 16:9

IMAGE PROCESSING DEVICE FOR GENERATING COMPOSITE IMAGE HAVING PREDETERMINED ASPECT RATIO

CROSS-REFERENCE TO RELATED APPLICATION

This application is based upon and claims the benefit of priority from the prior Japanese Patent Application No. 2011-085248, filed Apr. 7, 2011, the entire contents of which is incorporated herein by reference.

BACKGROUND OF THE INVENTION

1. Field of the Invention

The present invention relates to an image processing device and an imaging device such as a digital camera and a mobile phone having an imaging function, an image composition method and a recording medium.

2. Description of the Related Art

In Japanese Patent Application Laid-Open (Kokai) Publication No, 11-282100 feature points of a captured image are extracted and the coordinates thereof are detected. Next, the coordinates of the same feature points in an adjacent image subsequently captured is detected. Then, these adjacent images are combined such that their feature points coincide with each other. As a result, a panoramic image is generated.

However, in this conventional technology, there is no limitation on the size of an image in a horizontal direction in panoramic imaging, and therefore the imaging of a viewing angle range that the user wishes to capture can be performed as long as the range is within 360 degrees. As a result, the aspect ratio of the ultimately generated panoramic image is non-standard (or in other words, not 4:3 or 16:9). Although this aspect ratio does not become an issue when the image is viewed using a common display device, it is inconvenient when for example, the image is printed, which makes the image unsuitable for other purposes. That is, with the conventional technology, it is difficult to generate a composite image having an aspect ratio desired by the user.

SUMMARY OF THE INVENTION

An object of the present invention is to provide an image processing device, an image composition method and a recording medium capable of easily and efficiently generating a composite image having a desired aspect ratio.

In order to achieve the above-described object, in accordance with one aspect of the present invention, there is provided an image processing device comprising: a setting section which sets an arbitrary aspect ratio; a composite image acquiring section which acquires a composite image having a predetermined aspect ratio which has been generated by a plurality of captured images being combined; and an image processing section which trims the composite image acquired by the composite image acquiring section to be an image having the arbitrary aspect ratio set by the setting section.

The present invention has an advantage in that a wide-angle image having a desired aspect ratio is easily and efficiently captured.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 2 is a conceptual diagram for explaining a normal imaging mode;

FIG. 3 is a conceptual diagram for explaining the panoramic imaging mode of the digital camera 1 according to the first embodiment;

FIG. 8 is a flowchart for explaining operations of a digital camera 1 according to a second embodiment;

FIG. 9A and FIG. 9B are conceptual diagrams for explaining operations of the digital camera 1 according to the second embodiment.

DETAILED DESCRIPTION OF THE PREFERRED EMBODIMENTS

The preferred embodiments of the present invention will hereinafter be described with reference to the drawings.

A. First Embodiment

A-1. Configuration of the First Embodiment

Figure 1:
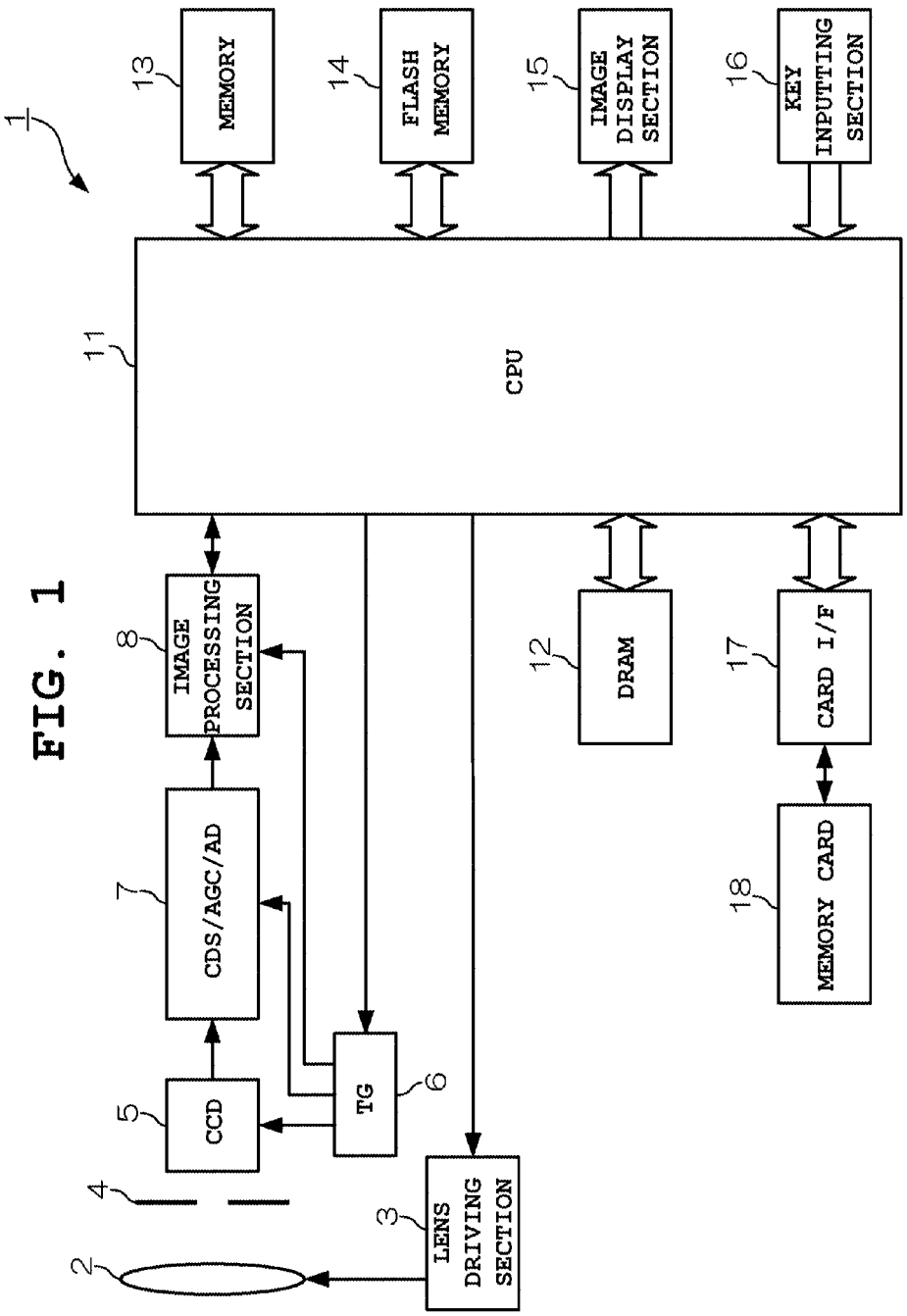
FIG. 1 is a block diagram showing the structure of a digital camera 1 according to a first embodiment of the present invention.

FIG. 1 is a block diagram showing the structure of a digital camera 1 according to a first embodiment of the present invention. In FIG. 1, the digital camera 1 includes an imaging lens 2, a lens driving section 3, a shutter-aperture 4, a charge-coupled device (CCD) 5 (imaging section), a timing generator (TG) 6, a unit circuit 7, an image processing section (image processing section, composite image generating section), a central processing unit (CPU) 11 (setting section, composite image acquiring section, aspect ratio judging section, display control section), a dynamic random access memory (DRAM) 12, a memory 13, a flash memory 14, an image display section 15 (display section), a key inputting section 16, a card interface (I/F) 17, and a memory card 18.

The imaging lens 2 includes a focus lens, a zoom lens, and the like, and is connected with the lens driving section 3. The lens driving section 3 includes a focus motor and a zoom motor that respectively drive the focus lens and the zoom lens constituting the imaging lens 2 in an optical axis direction, and a focus motor driver and a zoom motor driver that drive the focus motor and the zoom motor in accordance with control signals from the CPU 11.

The shutter-aperture 4 includes a driver circuit not shown, and the driver circuit operates the shutter-aperture 4 in accordance with control signals sent from the CPU 11. This shutter-aperture 4 controls the amount of light irradiated from the imaging lens 2. The CCD (image sensor) 5, which is driven in accordance with timing signals of a predetermined frequency generated by the TG 6, converts the light of a subject projected through the imaging lens 2 and the shutter-aperture 4 to electrical signals, and outputs them to the unit circuit 7 as imaging signals.

The unit circuit 7, which is also driven in accordance with timing signals of a predetermined frequency generated by the TG 6, includes a correlated double sampling (CDS) circuit that performs correlated double sampling on imaging signals outputted from the CCD 5 and holds the sampled imaging signals, an automatic gain control (AGC) circuit that performs automatic gain control on the sampled imaging signals, and an analog-to-digital (A/D) converter that converts the automatic-gain-controlled analog imaging signals to digital signals. Imaging signals outputted from the CCD 5 are sent to the image processing section 8 through this unit circuit 7, as digital signals.

The image processing section 8, which is also driven in accordance with timing signals of a predetermined frequency generated by the TG 6, performs image processing of image data sent from the unit circuit 7 (pixel interpolation processing, γ-correction, luminosity color difference signal generation, white balance processing, exposure correction processing, etc.), compression and extension processing of image data (such as compression and extension in Joint Photographic Experts Group (JPEG) format, Motion-JPEG [M-JPEG] format or Moving Picture Experts Group (MPEG) format), processing for combining a plurality of captured images, image processing for trimming and resizing a composite image to generate a wide-angle image having an aspect ratio specified by the user, etc.

The CPU 11 is a single-chip microcomputer that controls each section of the digital camera 1. In particular, according to the first embodiment, the CPU 11 controls each section such that a plurality of images are consecutively captured at a predetermined cycle (time interval) while the user is moving the digital camera 1, the captured images are combined in a manner that they are partially overlapped with each other (such as by α-blending), and a single composite image that appears to have been captured at a wide angle is generated. The details of the image composition will be described hereafter.

The DRAM 12 is used as a buffer memory that temporarily stores image data sent to the CPU 11 after being captured by the CCD 5, and as a working memory of the CPU 11. The memory 13 stores a program necessary for the CPU 11 to control each section of the digital camera 1 and data necessary to control each section, and the CPU 11 performs processing based on this program. The flash memory 14 and the memory card 18 are recording media that store image data captured by the CCD 5 and the like.

The image display section 15 includes a color liquid crystal display (LCD) having an aspect ratio of 4:3 and a driver circuit thereof. In an imaging stand-by state, the image display section 15 displays a subject captured by the CCD 5 as a through image. Also, the image display section 15 displays a recorded image that has been read out from the flash memory 14 or the memory card 23 and expanded when it is replayed. The key inputting section 16 includes a plurality of operation keys, such as a shutter switch (SW), a zoom SW, a mode key, a SET key, and a cross-shaped key, and outputs operation signals based on key operations by the user to the CPU 11. The memory card 18 is detachably mounted on the card I/F 17 by a card slot (not shown) in the main body of the digital camera 1.

FIG. 2 is a conceptual diagram for explaining a normal imaging mode. As shown in FIG. 2, when capturing in a normal imaging mode, the digital camera 1 can only capture an image 30 with the viewing angle of the imaging system in the digital camera 1.

FIG. 3 is a conceptual diagram for explaining the panoramic imaging mode of the digital camera 1 according to the first embodiment. In this mode, the user aims the digital camera 1 at a desired landscape by holding it in the vertical direction such that the longer side of the viewing angle is in the vertical direction. Then, the user depresses the shutter SW (half-depression to full depression) and moves the digital camera 1 in the horizontal direction (in the rightward direction from the left-side end) as indicated by the arrow in FIG. 3. While consecutively capturing images at a predetermined time interval (such as 7 fps or 10 fps), the digital camera 1 loads images for composition at predetermined timings, and combines them such that a preceding image and the following image are joined, whereby a desired wide-angle image 40 or 41 is generated. The wide-angle image 40 has an aspect ratio of 4:3 and the wide-angle image 41 has an aspect ratio of 16:9.

In the first embodiment, when the user specifies a desired aspect ratio in advance, how far the digital camera 1 should be moved in the horizontal direction (movement distance and imaging range) is displayed to the user in an easy-to-understand manner, so that the user can easily capture a wide-angle image having a desired aspect ratio. Note that wide-angle images that can be generated in the first embodiment are either wide-angle images having an aspect ratio of 4:3 or wide-angle images having an aspect ratio of 16:9, and both have the same number of pixels in the vertical direction (such as 4000 pixels). Since the numbers of pixels in the vertical direction are the same, size reduction processing can be performed at the same ratio even when these images are displayed in full-screen on the image display section 15.

In addition, in the first embodiment, a wide-angle image is captured by the digital camera 1 being moved in the horizontal direction while being held in the vertical direction such that the longer side of the viewing angle is in the vertical direction. This is because the amount of movement required for generating a wide-angle image having a desired aspect ratio can be minimized by increasing the number of pixels in the vertical direction, whereby the burden placed on the user can be reduced.

Moreover, in the first embodiment, image processing such as resizing and clipping, which is required when a wide-angle image having a desired aspect ratio is ultimately generated, is performed minimally. Accordingly, the burden placed on the hardware and the energy consumption can be reduced.

A-2. Operation of the First Embodiment

Next, operations of the first embodiment described above will be described.

Figure 4:
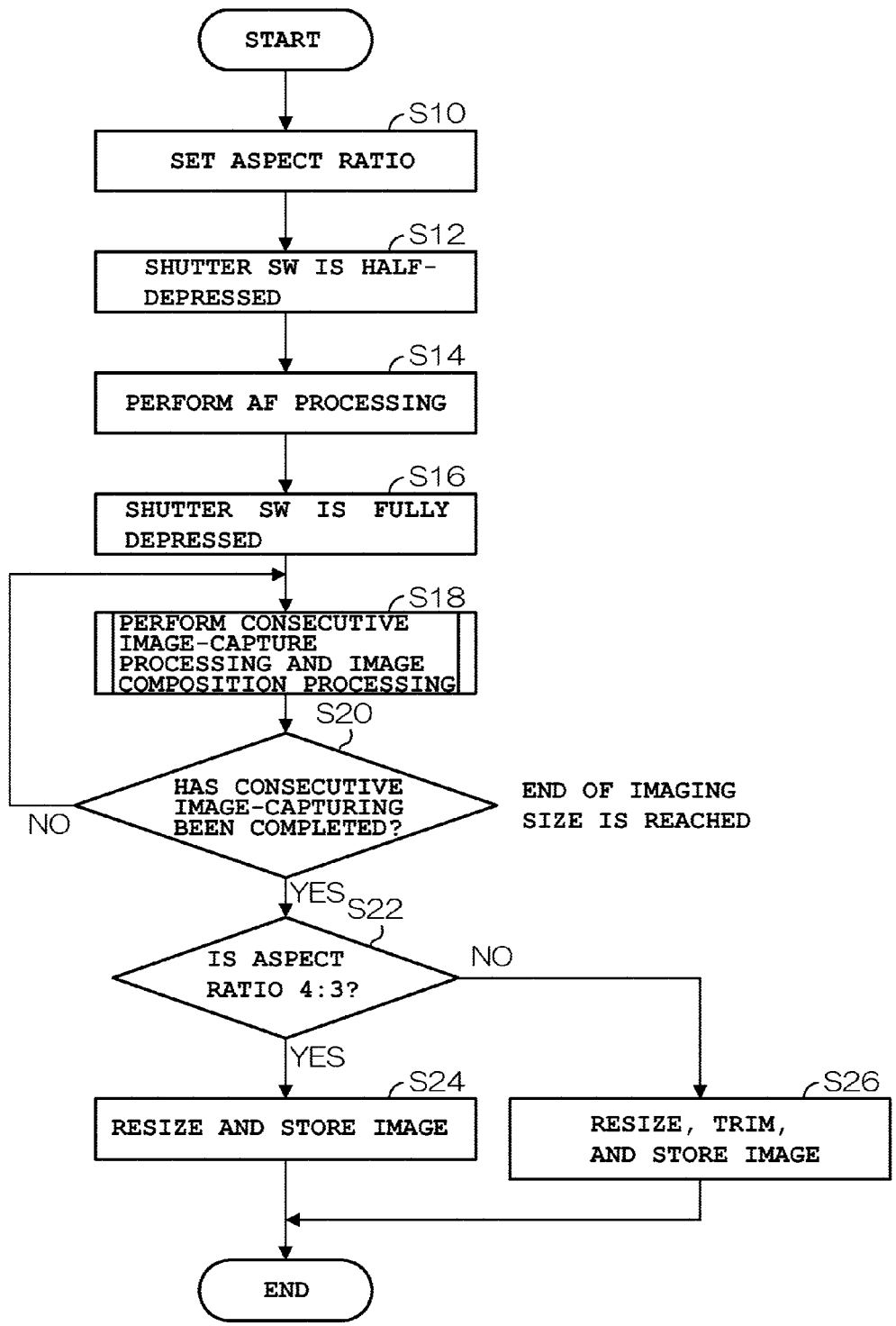
FIG. 4 is a flowchart for explaining operations of the digital camera 1 according to the first embodiment.
Figure 5:
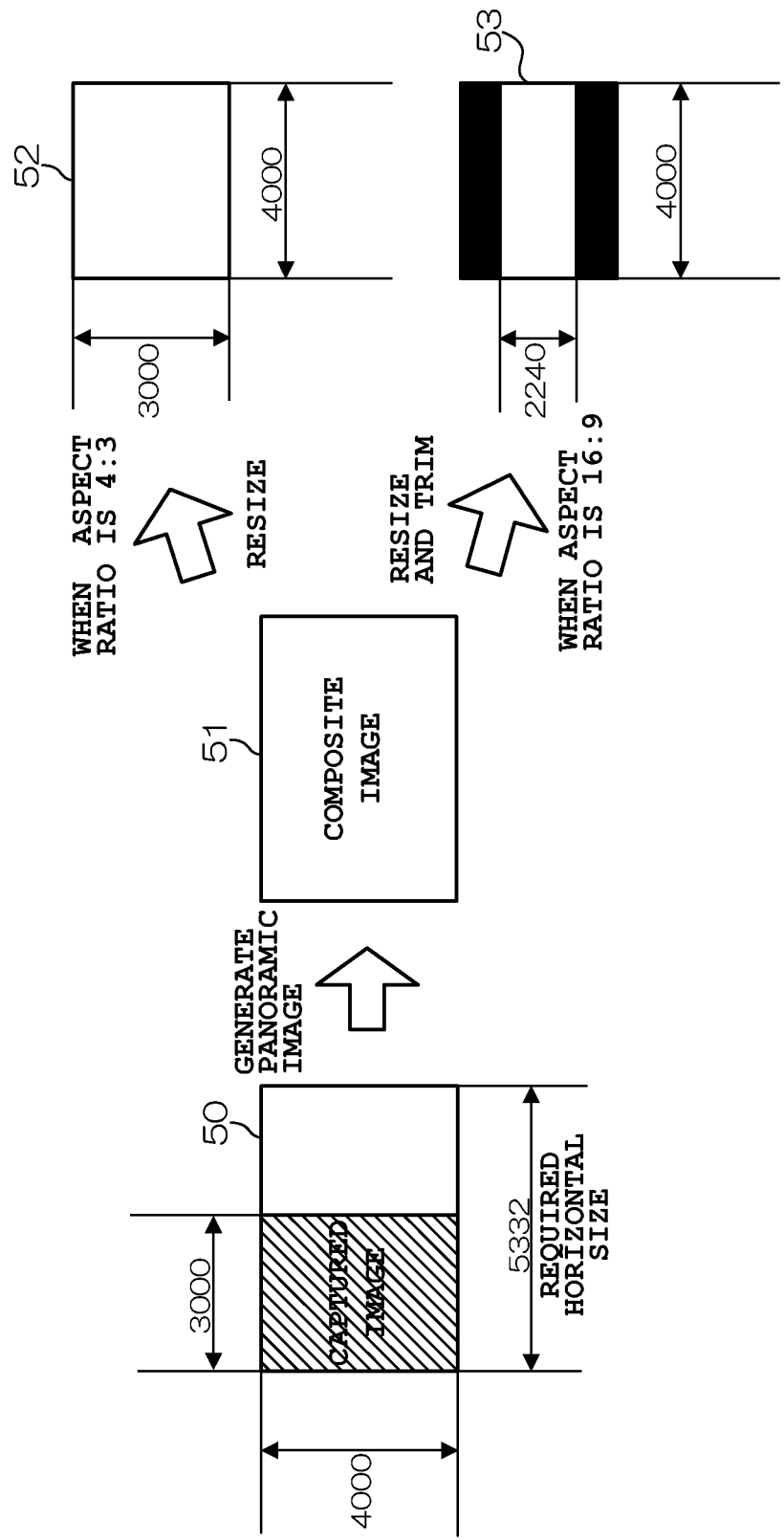
FIG. 5 is a conceptual diagram for explaining operations of the digital camera 1 according to the first embodiment.

FIG. 4 is a flowchart for explaining operations of the digital camera 1 according to the first embodiment. FIG. 5 is a conceptual diagram for explaining operations of the digital camera 1 according to the first embodiment. First, the user inputs or selects the aspect ratio of a wide-angle image that is ultimately generated, and sets this aspect ratio (Step S10). Then, when the user half-depresses the shutter. SW (Step S12), the CPU 11 performs auto-focusing (AF) (Step S14).

Next, the user aims the digital camera 1 at a desired landscape by holding it in the vertical direction such that the longer side of the viewing angle is in the vertical direction, and depresses (half-depression to full depression) the shutter SW which is positioned at the lower right of the vertically held camera 1. After fully depressing the shutter SW, the user moves the digital camera 1 to rotate in the horizontal direction (see FIG. 3). As a result of the digital camera 1 being held in the vertical direction, the size of an image captured in one shooting is 3000×4000 dots, as shown in FIG. 5. In this instance, because the image size is 4000 dots in the vertical direction, 5332 dots are required in the horizontal direction to generate a panoramic image having an aspect ratio of 4:3. Accordingly, the imaging size 50 is 5332×4000 dots.

When the shutter SW is fully depressed (Step S16), the CPU 11 consecutively captures images at a predetermined time interval (such as 7 fps or 10 fps), and every time the digital camera 1 reaches a predetermined position, the CPU 11 loads an image captured at that point as an image for composition, and sequentially combines the loaded images for composition, whereby a single image 51 is generated as shown in FIG. 5 (Step S18). The size of the composite image 51 is 5332×4000 dots. Details of the consecutive image-capture processing and the composition processing will be described hereafter.

Next, the CPU 11 judges whether or not the consecutive image-capturing has been completed (Step S20). This consecutive image-capturing is completed when the end of the imaging size set in advance is reached. When judged that the consecutive image-capturing has not been completed (NO at Step S20), the CPU 11 returns to Step S18 and continues the consecutive image-capture processing and the image composition processing. Conversely, when judged that the consecutive image-capturing has been completed (YES at Step S20) the CPU 11 judges whether or not the set aspect ratio is 4:3 (judges whether the set aspect is the same as or different from 4:3) (Step S22).

When judged that the aspect ratio has been set to 4:3 (aspect ratio of 4:3 has been specified) (YES at Step S22), the CPU 11 resizes the composite image 51 of 5332×4000 dots to a wide-angle image 52 of 4000×3000 dots whose aspect ratio is 4:3 (reduces the size with a fixed aspect ratio), and stores this wide-angle image 52 (Step S24).

On the other hand, when judged that the aspect ratio has been set to 16:9 (aspect ratio of 16:9 has been specified) (NO at Step S22), the CPU 11 resizes the composite image 51 of 5332×4000 dots to an image of 4000×3000 dots whose aspect ratio is 4:3 (reduces the size with a fixed aspect ratio), and after trimming (cutting) the image to a wide-angle image 53 of 4000×2240 dots whose aspect ratio is 16:9, stores this wide-angle image 53 (Step S26). Accordingly, in this instance, the wide-angle image 52 whose aspect ratio is 4:3 and the wide-angle image 53 whose aspect ratio is 16:9 have the same imaging angle (imaging range in the horizontal direction).

Figure 6:
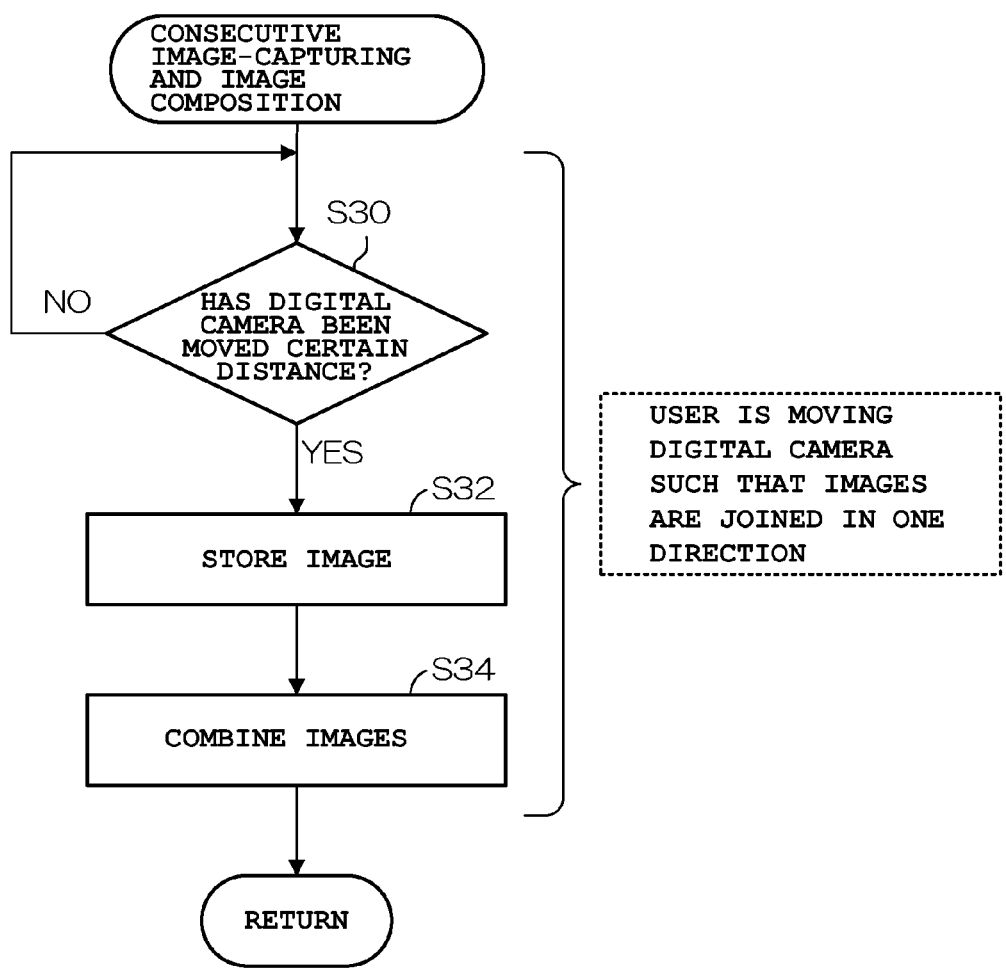
FIG. 6 is a flowchart for explaining the operation of consecutive image-capture processing performed by the digital camera 1 according to the first embodiment.

FIG. 6 is a flowchart for explaining the operation of the consecutive image-capture processing performed by the digital camera 1 according to the first embodiment. During the consecutive image-capture processing and the image composition processing, the CPU 11 controls the CCD 5 and the like to consecutively capture images at a predetermined time interval (such as 7 fps or 10 fps). Note that not all the captured images are loaded as images for composition. Only images captured at predetermined loading positions are loaded as images for composition, and the other captured images are discarded.

First, the CPU 11 judges whether or not the digital camera 1 has been moved a certain distance (Step S30). Here, the CPU 11 judges whether or not a captured image is an image that has been captured at a predetermined loading position, by determining an overlapping area of the images being consecutively captured at a predetermined time interval. The "image captured at a predetermined loading position" herein is an image whose predetermined area (such as one of the image) overlaps with the preceding loaded image for composition. In other words, the "image captured at a predetermined loading position" refers to an image including an overlapping area required for image composition.

That is when a captured image is an image that should be loaded as an image for composition, since this indicates that the digital camera 1 has reached a predetermined position, the CPU 11 judges that the digital camera 1 has moved a certain distance. In other words the digital camera 1 has not yet reached a predetermined position if the overlapping area is large, and has passed a predetermined position if the overlapping area is small.

When judged that the digital camera 1 has not been moved a certain distance (NO at Step S30), the CPU 11 repeatedly performs Step S30 because the digital camera 1 has not yet reached a predetermined position. Conversely, when judged that the digital camera 1 has been moved a certain distance (YES at Step S30), the CPU 7 loads and stores an image captured at this point (Step S32).

Next the CPU 11 combines the preceding image for composition and the currently loaded image for composition in a manner that they are partially overlapped with each other (such as by α-blending), and after storing the composite image (Step S34), returns to the main routine shown in FIG. 4.

The sequentially loaded images for composition are sequentially combined until the end of the imaging size set in advance is reached, whereby a single joined composite image (panoramic image) is generated.

Figure 7:
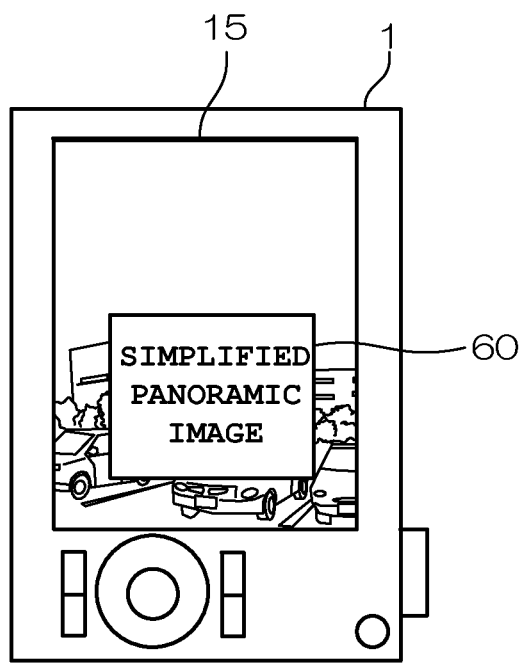
FIG. 7 is a schematic diagram showing a display example during panoramic imaging by the digital camera 1 according to the first embodiment.

FIG. 7 is a schematic diagram showing a display example during panoramic imaging by the digital camera 1 according to the first embodiment. During panoramic imaging, an imaging range 60 set in advance is displayed on the image display section 15, in which the composite images (reduced version) sequentially acquired by the consecutive image-capture processing and the image composition processing at Step S34 are sequentially displayed, as shown in FIG. 7. As a result, the user can know how far he has captured and how much more he needs to capture, during imaging.

According to the above-described first embodiment, the user can easily and efficiently capture a wide-angle image having a desired aspect ratio without performing lens replacement.

Note that, although the aspect ratio is specified and set prior to imaging in the above-described first embodiment, the timing is not limited thereto, and the aspect ratio can be specified after imaging (such as between Step S20 and Step S22 in FIG. 4).

Also note that, when the wide-angle image 53 of 4000× 2240 dots which has an aspect ratio of 16:9 is to be trimmed (cut) from the composite image 51 of 5332×4000 dots as shown in FIG. 5, the area to be trimmed from the composite image 51 may be specified by user operation.

B. Second Embodiment

Next, a second embodiment of the present invention will be described.

In the second embodiment, when an aspect ratio is specified prior to imaging, a wide-angle image having the desired aspect ratio is generated by reciting being performed after a composite image corresponding to the aspect ratio is captured and generated. Note that the structure of the digital camera 1 is the same as that in FIG. 1, and therefore explanations thereof are omitted.

FIG. 8 is a flowchart for explaining operations of the digital camera 1 according to the second embodiment. FIG. 9A and FIG. 9B are conceptual diagrams for explaining operations of the digital camera 1 according to the second embodiment. First, the user inputs or selects the aspect ratio of a wide-angle image that is ultimately generated, and sets this aspect ratio (Step S40). Next, the CPU 11 sets an imaging size corresponding to the aspect ratio (Step S42).

When the aspect ratio is 4:3, the CPU 11 sets an imaging size 70 of 5332×4000 dots, as shown in FIG. 9A. In this case, as a result of the digital camera 1 being held in the vertical direction, the size of an image captured in one shooting is 3000×4000 dots. When the aspect ratio is 16:9, the CPU 11, sets an imaging size 80 of 7111×4000 dots, as shown in FIG. 9B. In this case as well, the size of an image captured in one shooting is 3000×4000 dots, as a result of the digital camera 1 being held in the vertical direction.

Then, when the user half-depresses the shutter SW (Step S44), the CPU 11 performs auto-focusing (AF) (Step S46).

Next, the user aims the digital camera 1 at a desired landscape by holding it in the vertical direction such that the longer side of the viewing angle is in the vertical direction, and depresses (half-depression to full depression) the shutter SW. After fully depressing the shutter SW, the user moves the digital camera 1 in the horizontal direction (see FIG. 3).

When the shutter SW is fully depressed (Step S48), the CPU 11 consecutively captures images at a predetermined time interval (such as 7 fps or 10 fps), and every time the digital camera 1 reaches a predetermined position, the CPU 11 loads an image captured at that point as an image for composition, and sequentially combines the loaded images for composition, whereby a single wide-angle image is generated (Step S50).

When the aspect ratio is 4:3, a composite image 71 of 5332×4000 dots is generated, as shown in FIG. 9A. When the aspect ratio is 16:9, a composite image 81 of 7111×4000 dots is generated, as shown in FIG. 9B. Details of the consecutive image-capture processing and the image composition processing are the same as those of the first embodiment described above, and therefore explanations thereof are omitted (see FIG. 6).

Next, the CPU 11 judges whether or not the consecutive image-capturing has been completed (Step S52). This consecutive image-capturing is completed when the end of the imaging size set in advance is reached. That is, in the case where the aspect ratio is 4:3, the consecutive image-capturing is completed when the composite image 71 of 5332×4000 dots is generated. In the case where the aspect ratio is 16:9, the consecutive image-capturing is completed when the composite image 81 of 7111×4000 dots is generated. When judged that the consecutive image-capturing has not been completed (NO at Step S52), the CPU 11 returns to Step S50 and continues the consecutive image-capture processing and the image composition processing. Conversely, when judged that the consecutive image-capturing has been completed (YES at Step S52), the CPU 11 judges whether or not the set aspect ratio is 4:3 (judges whether the set aspect is the same as or different from 4:3) (Step S54).

When judged that the aspect ratio has been set to 4:3 (aspect ratio of 4:3 has been specified) (YES at Step S54), the CPU 11 resizes the composite image 71 of 5332×4000 dots to a wide-angle image 72 of 4000×3000 dots whose aspect ratio is 4:3 (reduces the size with a fixed aspect ratio), and stores this wide-Wangle image 72, as shown in FIG. 9A (Step S56). On the other hand, when judged that the aspect ratio has been set to 16:9 (aspect ratio of 16:9 has been specified) (NO at Step S54), the CPU 11 resizes the composite image 81 of 7111×4000 dots to a wide-angle image 82 of 4000×2240 dots whose aspect ratio is 16:9 (reduces the size with a fixed aspect ratio), and stores this wide-angle image 82, as shown in FIG. 9B (Step S58). Accordingly, the wide-angle image 82 whose aspect ratio is 16:9 has a wider imaging angle (imaging range in the horizontal direction) as compared to the wide-angle image 72 whose aspect ratio is 4:3.

Figure 10A:
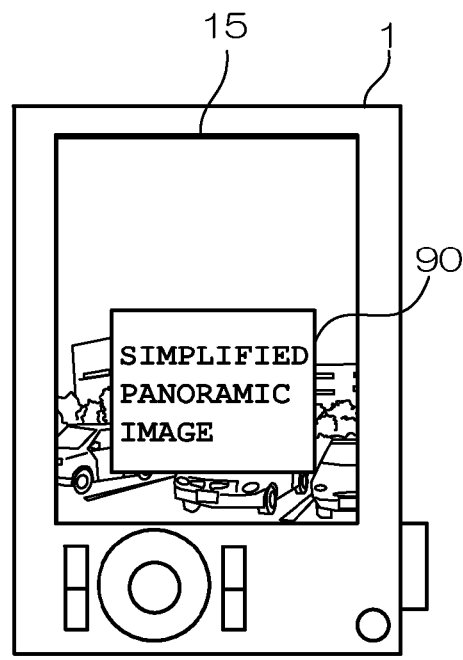
FIG. 10A and FIG. 10B are schematic diagrams showing display examples during panoramic imaging by the digital camera 1 according to the second embodiment.
Figure 10B:
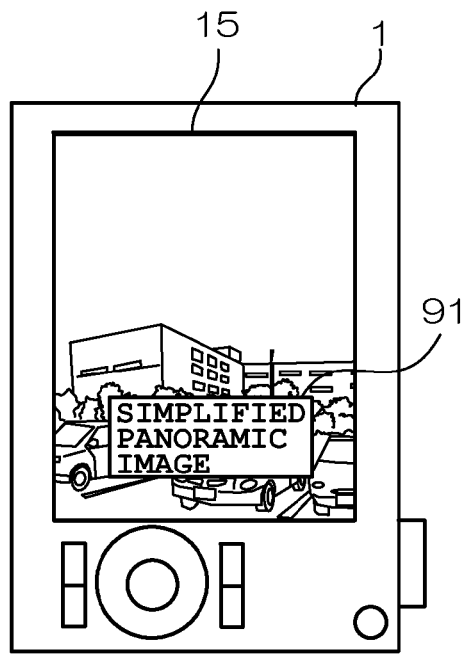

FIG. 10A and FIG. 10B are schematic diagrams showing display examples during panoramic imaging by the digital camera 1 according to the second embodiment. When an aspect ratio of 4:3 is set, a predetermined imaging range 90 having an aspect ratio of 4:3 is displayed on the image display section 15 during panoramic imaging, as shown in FIG. 10A. In this imaging range 90, composite images (reduced version) sequentially acquired by the consecutive image-capture processing and the image composition processing at Step S50 are sequentially displayed.

On the other hand, when an aspect ratio of 16:9 is set, a predetermined imaging range 91 having an aspect ratio of 16:9 is displayed on the image display section 15 during panoramic imaging, as shown in FIG. 10B. In this case as well, in the imaging range 91, composite images (reduced version) sequentially acquired by the consecutive image-capture processing and the image composition processing at Step S50 are sequentially displayed. As a result, the user can know how far he has captured and how much more he needs to capture, during imaging.

According to the above-described second embodiment, the user can easily and efficiently capture a wide-angle image having a desired aspect ratio without performing lens replacement.

In the above-described first and second embodiments, whether or not the digital camera 1 has reached a predetermined position is judged based on a captured image. However, the present invention is not limited thereto, and it may be judged based on information from a direction sensor, an acceleration sensor, etc.

Also, in the above-described first and second embodiments, only a desired aspect ratio is inputted and set. However, the image size of a wide-angle image that is ultimately generated may also be specified in addition to the aspect ratio. In this case, resizing and trimming for achieving a specified aspect ratio and a specified image size are accordingly performed when a wide-angle image is ultimately generated.

While the present invention has been described with reference to the preferred embodiments, it is intended that the invention be not limited by any of the details of the description therein but includes all the embodiments which fall within the scope of the appended claims.

What is claimed is:

1. An image processing device comprising:
    a processor which is configured to function as:
        a setting section which sets an arbitrary aspect ratio;
        a composite image acquiring section which acquires a composite image having a predetermined aspect ratio, which has been generated by combining a plurality of captured images;
        an aspect ratio judging section which judges whether the predetermined aspect ratio is different from the set arbitrary aspect ratio; and
        an image processing section which, in a case in which the aspect ratio judging section judges that the predetermined aspect ratio is different from the set arbitrary aspect ratio, trims the composite image acquired by the composite image acquiring section to be an image having the set arbitrary aspect ratio,
    wherein, in a case in which the aspect ratio judging section judges that the predetermined aspect ratio is not different from the set arbitrary aspect ratio, the image processing section does not trim the composite image acquired by the composite image acquiring section, and resizes the composite image.

2. The image processing device according to claim 1, wherein the setting section further sets a size of a composite image that is ultimately generated; and
wherein the image processing section further resizes the composite image acquired by the composite image acquiring section based on the size set by the setting section.

3. The image processing device according to claim 1, further comprising:
an imaging section; and
wherein the processor is further configured to function as a composite image generating section which generates the composite image having the predetermined aspect ratio by combining a plurality of images captured by the imaging section;
wherein the composite image acquiring section acquires the composite image generated by the composite image generating section.

4. The image processing device according to claim 3, wherein the plurality of captured images are images consecutively captured while a user is moving the image processing device in a horizontal direction with a longer side of a pixel array of the imaging section being in a vertical direction of an imaging viewing angle.

5. The image processing device according to claim 1, further comprising:
a display section; and
wherein the processor is further configured to function as a display control section which displays on the display section an imaging range corresponding to the composite image and an area which has not yet been captured within the imaging range.

6. An imaging device comprising:
an imaging section; and
a processor which is configured to function as:
a setting section which sets an aspect ratio of a composite image to be generated;
a composite image generating section which generates, from images captured by the imaging section while the imaging device is being moved in a predetermined direction, the composite image having the set aspect ratio such that the composite image having the set aspect ratio is generated to be recorded without using a trimming process; and
a specification section which specifies a timing when an aspect ratio of the composite image to be generated from the plurality of images captured while the imaging device is moved in the predetermined direction substantially coincides with the aspect ratio set by the setting section without using the trimming process,
wherein the composite image generating section generates, from the images captured by a time when the specification section specifies the timing, the composite image having the set aspect ratio.

7. The imaging device according to claim 6,
wherein the processor is further configured to function as an image processing section which resizes the composite image generated by the composite image generating section.

8. The imaging device according to claim 6,
wherein the setting section further sets a size of the composite image; and
wherein the image processing section resizes the composite image generated by the composite image generating section based on the size set by the setting section.

9. The imaging device according to claim 6, wherein the plurality of images captured by the imaging section are images consecutively captured while a user is moving the imaging device in a horizontal direction with a longer side of a pixel array of the imaging section being in a vertical direction of an imaging viewing angle.

10. The imaging device according to claim 6, further comprising:
a display section; and
wherein the processor is further configured to function as a display control section which displays on the display section an imaging range corresponding to the composite image having the aspect ratio and an area which has not yet been captured within the imaging range.

11. An image composition method for an image processing device including a processor, the method comprising:
setting, with the processor, an arbitrary aspect ratio;
acquiring, with the processor, a composite image having a predetermined aspect ratio, which has been generated by combining a plurality of captured images;
judging, with the processor, whether the predetermined aspect ratio is different from the set arbitrary aspect ratio; and
trimming, with the processor, the composite image to be an image having the set arbitrary aspect ratio in a case in which it is judged that the predetermined aspect ratio is different from the set arbitrary aspect ratio,
wherein in a case in which it is judged that the predetermined aspect ratio is not different from the arbitrary aspect ratio, the trimming of the composite image is not performed and the composite image is resized.

12. An image composition method by an imaging device including an imaging section which captures images, the method comprising:
setting an aspect ratio of a composite image to be generated;
generating, from images captured by the imaging section while the imaging device is being moved in a predetermined direction, the composite image having the set aspect ratio such that the composite image having the set aspect ratio is generated to be recorded without using a trimming process; and
specifying a timing when an aspect ratio of the composite image to be generated from the plurality of images captured while the imaging device is moved in the predetermined direction substantially coincides with the set aspect ratio without using the trimming process,
wherein the composite image having the set aspect ratio is generated from the images captured by a time when the timing is specified.

13. A non-transitory computer-readable storage medium having stored thereon a program that is executable by a computer, the program being executable by the computer to perform functions comprising:
setting an arbitrary aspect ratio;
acquiring a composite image having a predetermined aspect ratio, which has been generated by combining a plurality of captured images;
judging whether the predetermined aspect ratio is different from the set arbitrary aspect ratio; and
trimming the acquired composite image to be an image having the set arbitrary aspect ratio in a case in which it is judged that the predetermined aspect ratio is different from the set arbitrary aspect ratio, wherein in a case in which it is judged that the predetermined aspect ratio is not different from the arbitrary aspect ratio, the trimming of the composite image is not performed and the composite image is resized.

14. A non-transitory computer-readable storage medium having stored thereon a program that is executable by a computer of an imaging device including an imaging section, the program being executable by the computer to perform functions comprising:

setting an aspect ratio of a composite image to be generated;

generating, from images captured by the imaging section while the imaging device is being moved in a predetermined direction, the composite image having the set aspect ratio such that the composite image having the set aspect ratio is generated to be recorded without using a trimming process; and specifying a timing when an aspect ratio of the composite image to be generated from the plurality of images captured while the imaging device is moved in the predetermined direction substantially coincides with the set aspect ratio without using the trimming process, wherein the composite image having the set aspect ratio is generated from the images captured by a time when the timing is specified.

* * * * *